United States Patent
Huang et al.

(10) Patent No.: US 9,312,715 B2
(45) Date of Patent: Apr. 12, 2016

(54) BATTERY DEVICE POWER PROTECTION AND RESET CIRCUIT

(71) Applicant: Chicony Electronics Co., Ltd., New Taipei (TW)

(72) Inventors: Wei-Cheng Huang, New Taipei (TW); Mei-Yi Tsai, New Taipei (TW); Wei-Ming Chiu, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 578 days.

(21) Appl. No.: 13/684,589

(22) Filed: Nov. 26, 2012

(65) Prior Publication Data

US 2013/0162219 A1 Jun. 27, 2013

(30) Foreign Application Priority Data

Dec. 21, 2011 (TW) .............................. 100147774 A

(51) Int. Cl.
*H02J 7/00* (2006.01)

(52) U.S. Cl.
CPC ............. *H02J 7/0063* (2013.01); *H02J 7/0032* (2013.01)

(58) Field of Classification Search
CPC ..................... H02J 7/0026; H02J 2007/004
USPC ............................................. 320/135
See application file for complete search history.

(56) References Cited

U.S. PATENT DOCUMENTS

| | | | | |
|---|---|---|---|---|
| 4,950,856 | A * | 8/1990 | Valenzona | 200/526 |
| 6,271,605 | B1 * | 8/2001 | Carkner et al. | 307/125 |
| 6,924,624 | B2 * | 8/2005 | Baur et al. | 320/132 |
| 7,912,618 | B2 * | 3/2011 | Owens et al. | 701/102 |
| 2005/0009496 | A1 * | 1/2005 | Chen | 455/334 |
| 2011/0193518 | A1 * | 8/2011 | Wright et al. | 320/101 |
| 2011/0248680 | A1 * | 10/2011 | Timmons et al. | 320/120 |
| 2011/0302437 | A1 * | 12/2011 | Haddab et al. | 713/323 |

* cited by examiner

*Primary Examiner* — Drew A Dunn
*Assistant Examiner* — Jerry D Robbins
(74) *Attorney, Agent, or Firm* — CKC & Partners Co., Ltd.

(57) ABSTRACT

An electronic device and a method of operating the same are disclosed, where the electronic device includes a main system, a battery, and a battery device power protection and reset circuit. The battery device power protection and reset circuit includes a charging circuit and a switch device. The switch device connects the battery and the main system. The charging circuit turns off the switch device when operating under a first trigger mode, so that the switch device can electrically isolate the main system from the battery.

4 Claims, 2 Drawing Sheets

BATTERY DEVICE POWER PROTECTION AND RESET CIRCUIT

RELATED APPLICATIONS

This application claims priority to Taiwan Application Serial Number 100147774, filed Dec. 21, 2011, which is herein incorporated by reference.

BACKGROUND

1. Technical Field

The present disclosure relates to an electronic device and a method of operating the same, and more particularly, an electronic device having a battery device power protection and reset circuit and a method of operating the same.

2. Description of Related Art

Recently, with the progression of the industry and commerce and the advancements in human society, the products on the market are aimed to be convenient, accurate, and economical. Therefore, the products that are developed ere better than the old products and make contributions to the society.

Generally, electronic devices with batteries, after being manufactured, would be transported to storage and/or redistribution facilities, and are eventually purchased by end customers. The above-mentioned processes take a long time. During this period, if the battery is directed connected to the system, the power of the battery would be consumed. Hence, the customer must charge the electronic device before use.

Further, if the fool-proofing system of the electronic device crashes, the system shall be reset. However, some electronic devices do not have a reset key, and therefore, the user has to wait until the system power is down so as to operate the device. Nonetheless, this process may lead to over discharging that may jeopardize the battery life In view of the foregoing, there exist problems and disadvantages in the current electronic devices that await further improvement. However, those skilled in the art sought vainly for a solution, In order to solve or circumvent above problems and disadvantages, there is an urgent need in the related field to separate the battery from the system so as to avoid the power loss during transportation and storage.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to an electronic device and a method of operating the same for to solving or circumventing aforesaid problems.

According to one embodiment of the present invention, an electronic device comprises a main system, a battery, and a battery device power protection and reset circuit. The battery device power protection and reset circuit includes a charging circuit and a switch device. The switch device connects the battery and the main system. The charging circuit turns off the switch device when operating under a first trigger mode, so that the switch device can electrically isolate the main system from the battery.

After the main system is electrically isolated from the battery, the charging circuit turns on the switch device when operating under a second trigger mode, so that the switch device can electrically connect the main system to the battery, The electronic device further comprises a power button. The power button is connected to the battery and the charging circuit, wherein when the power button is pressed over a predetermined period, the charging circuit operates under the first trigger mode and is charged by the battery, and a charging voltage of the charging circuit turns off the switch device.

After the main system is electrically isolated from the battery, when the power button is pressed again but duration of pressing the power button is shorter than the predetermined period, the charging circuit operates under the second trigger mode to turn on the switch device.

The power button has a first terminal electrically coupled with the battery and a second terminal electrically coupled with the charging circuit, the first and second terminals are electrically connected to each other when the power button is pressed, and the first and second terminals are electrically isolated from each other when the power button is not pressed.

According to another embodiment of the present invention, a method of operating an electronic device that includes a main system, a battery, a charging circuit and a switch device, the method comprises a step (a) of: utilizing the charging circuit to turn off the switch device when operating under a first trigger mode, so that the switch device electrically isolates the main system from the battery.

After the main system is electrically isolated from the battery, the method further comprises a step (b) of: utilizing the charging circuit to turn on the switch device when operating under a second trigger mode, so that the switch device electrically connect the main system to the battery.

The electronic device further includes a power button, and the step (a) comprises: when the power button is pressed over a predetermined period, charging the charging circuit in the first trigger mode by the battery, so that a charging voltage of the charging circuit turns off the switch device.

The step (b) comprises: after the main system is electrically isolated from the battery, when the power button is pressed again but duration of pressing the power button is shorter than the predetermined period, turning on the switch device by the charging circuit in the second trigger mode.

The battery and the charging circuit are electrically connected to each other when the power button is pressed, and the battery and the charging circuit are electrically isolated from each other when the power button is not pressed.

Technical advantages are generally achieved, by embodiments of the present invention, as follows:

1. A power switch (i.e., the power button) is utilized to isolate the battery from the main system before a product is dispatched from a factory, so as to avoid the power consumption during transport processes, and when a customer buys the product and then presses the power switch, the main system is charged by the battery; and 2. The power switch can be pressed for a longer period to power off the main system, so as to accomplish a reset function.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
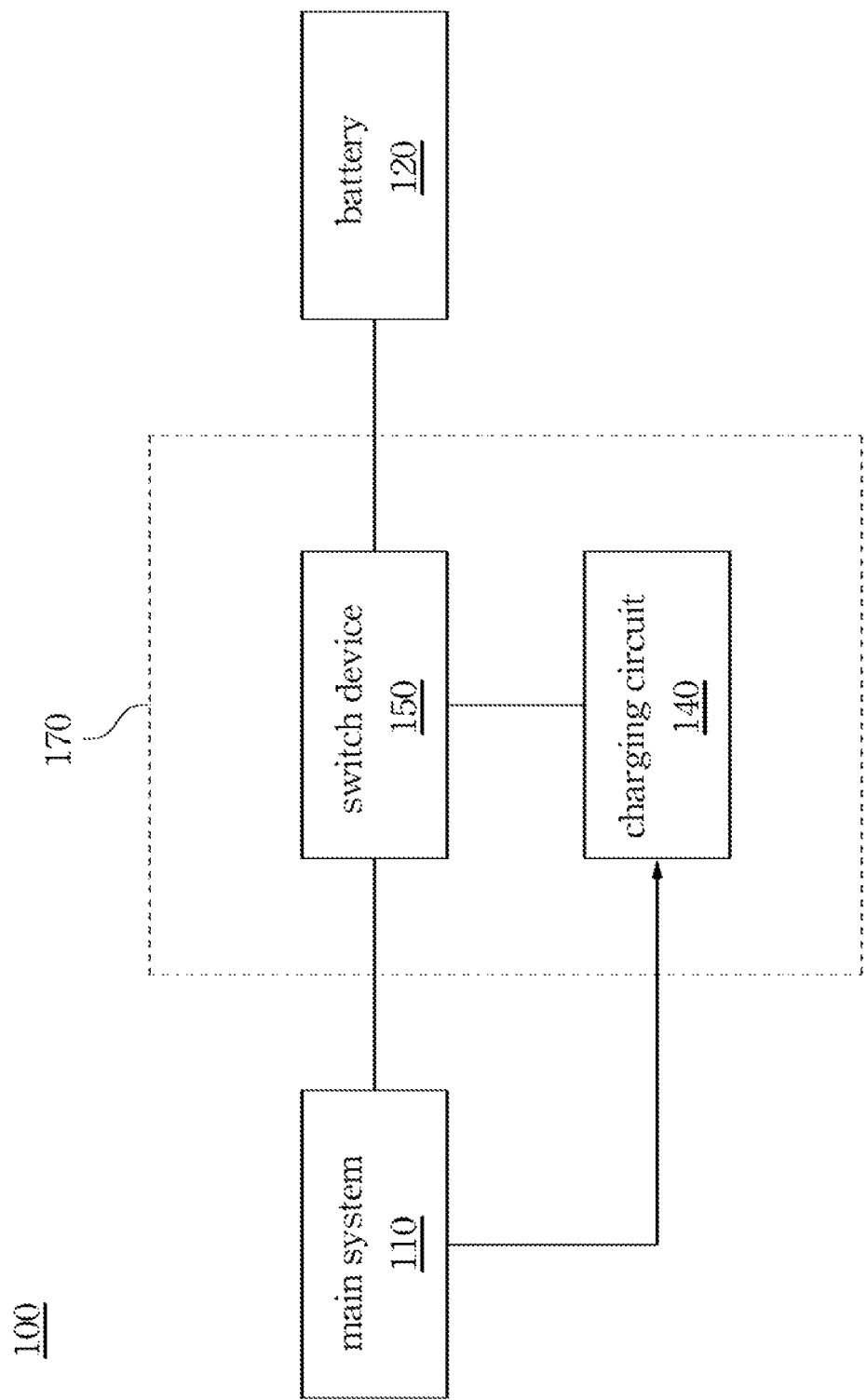
FIG. 1 is a block diagram of an electronic device according to one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that when an element is referred to as being "connected" or "coupled" to another element, it can be directly connected or o coupled to the other element or intervening elements may be present. In contrast, when an element is referred to as being "directly connected" or "directly coupled" to another element, there are no intervening elements present.

Also, as used in the description herein and throughout the claims that follow, the term "about" modifying any quantity refers to variation in the numerical quantity that would not affect the nature of the quantity. Unless specified otherwise, in the present embodiments, the term "about" means within 20% of the reported numerical value, preferably within 10% of the reported numerical value, and more preferably within 5% of the reported numerical value.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one aspect, the present disclosure is directed to an electronic device. This electronic device may be inserted in an electronic product having a battery, or may be widely used in other relevant technical fields. It should be noted that the present electronic device has a battery device power protection and reset circuit. The specific embodiments exemplifying the battery device power protection and reset circuit are described below in conjunction with FIG. 1 to FIG. 2.

FIG. 1 is a block diagram of an electronic device 100 according to one embodiment of the present disclosure. As illustrated in FIG. 1, the electronic device 100 comprises a main system 110, a battery 120, and a battery device power protection and reset circuit 170.

In practice, the battery 120 of the electronic device 100 may be a rechargeable battery that is replaceable. Alternatively, the battery 120 of the electronic device 100 may be a built-in battery that is unreplaceable.

In FIG. 1, the battery device power protection and reset circuit 170 includes a charging circuit 140 and a switch device 150. The switch device 150 connects the battery 120 and the main system 110.

During production, when the production process is finished and then the electronic device 100 is packaged into a product, the charging circuit 140 turns off the switch device 150 when operating under a first trigger mode, so that the switch device 150 can electrically isolate the main system 110 from the battery 120. Thus, the main system 110 cannot waste the electric quantity of the battery 120.

When a customer buys the product with the electronic device 100, main system 110 is isolated from the battery 120. In use, after the main system 110 is electrically isolated from the battery 120, the charging circuit 140 turns on the switch device 150 when operating under a second trigger mode, so that the switch device 150 can electrically connect the main system 110 to the battery 120. Thus, the battery 120 provides electric power for the main system 110, and the customer can use the product.

Figure 2:
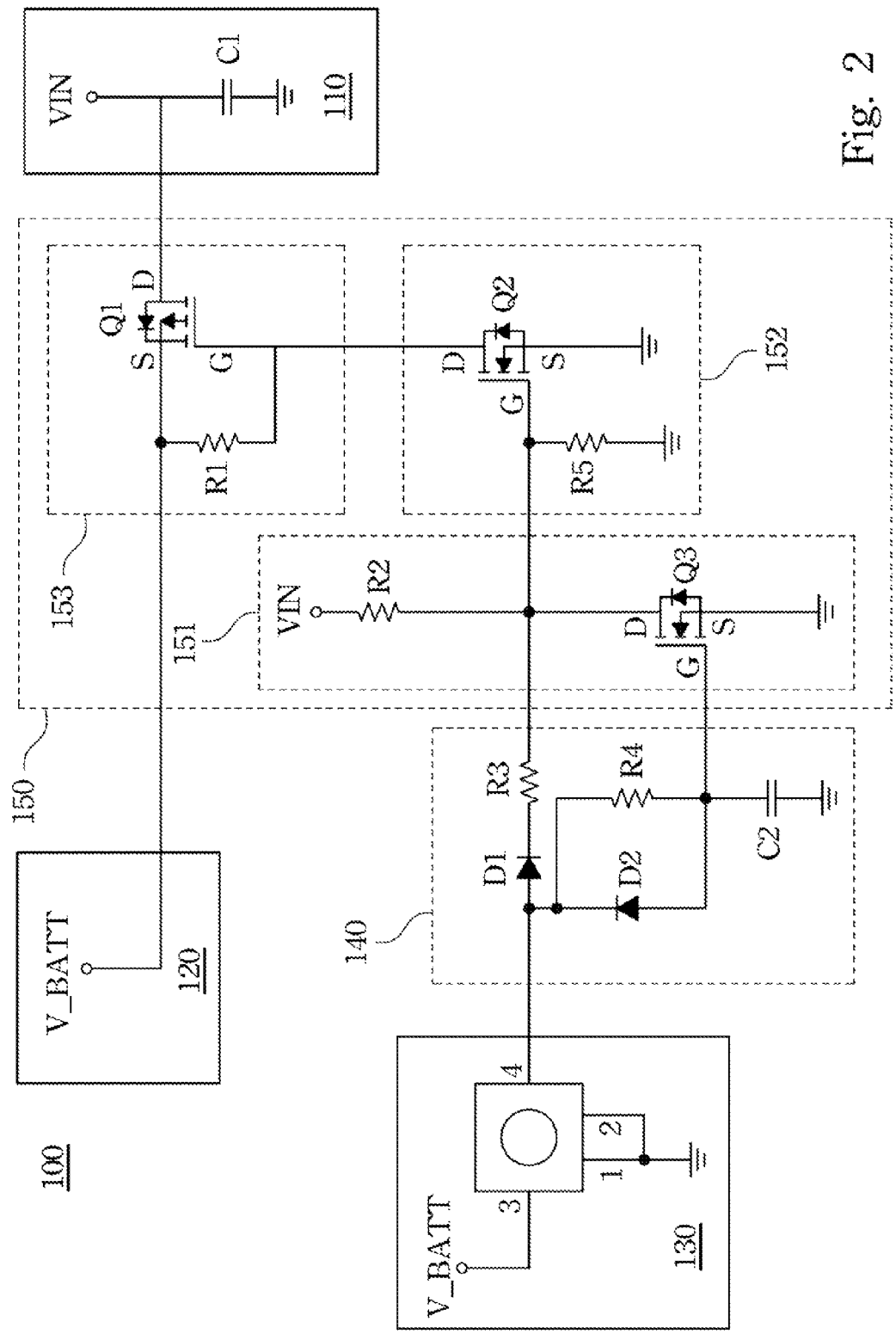
FIG. 2 is an equivalent-circuit diagram of the electronic device of FIG. 1.

For a more complete understanding of the electronic device 100, and the advantages thereof, refer to FIG. 2. FIG. 2 is an equivalent-circuit diagram of the electronic device 100. Compared with FIG. 1, the electronic device 100 in FIG. 2 further comprises a power button 130. The power button 130 is connected to the battery 120 and the charging circuit 140. The main system 110 has a voltage input terminal VIN and a charging capacitor C1.

In this embodiment, the first trigger mode is that the power button 130 is pressed over a predetermined period. During production, when the production process is finished and then the electronic device 100 is packaged into the product, the power switch 130 can be pressed for a longer period. When the power button 130 is pressed over a predetermined period, the charging circuit 140 operates under the first trigger mode and is charged by the battery 120, and a charging voltage of the charging circuit 140 turns off the switch device 150, so that the switch device 150 can electrically isolate the main system 110 from the battery 120. Thus, the main system 110 cannot waste the electric quantity of the battery 120.

In this embodiment, the second trigger mode is that the power button 130 is pressed again but duration of pressing the power button 130 is shorter than the predetermined period. When a customer buys the product with the electronic device 100, main system 110 is isolated from the battery 120. In use, the customer can press the power button 130, and when the power button 130 is pressed but the duration of pressing the power button 130 is shorter than the predetermined period, the charging circuit 140 operates under the second trigger mode to turn on the switch device 150. Thus, the battery 120 provides electric power for the main system 110, and the customer can use the product.

In FIG. 2, the switch device 150 comprises a first switch circuit 151, a second switch circuit 152 and a third switch circuit 153. The charging circuit 140 is electrically coupled with the power button 130. The first switch circuit 151 is electrically coupled to the power button 130 via the charging circuit 140. The second switch circuit 152 is electrically coupled to the first switch circuit 151. The third switch circuit 153 is electrically coupled with the second switch circuit 152 and is connected to the battery 120 and the main system 110.

During production, when the production process is finished and then the electronic device 100 is packaged into the product, the power switch 130 can be pressed for a longer period. When the power button 130 is pressed over the predetermined period, the charging voltage of the charging circuit 140 turns on the first switch circuit 151, so as to turn off the second and third switch circuits 152 and 153, and therefore the third switch circuit 153 can electrically isolate the main system 110 from the battery 120. Thus, the main system 110 cannot waste the electric quantity of the battery 120.

When a customer buys the product with the electronic device 100, main system 110 is isolated from the battery 120. In use, the customer can press the power button 130, and when the power button 130 is pressed but the duration of pressing the power button 130 is shorter than the predetermined period, the second and third switch circuits 152 and 153 are turned on, so that the third switch circuit 153 can electrically connect the battery 120 to the main system 110. Thus, the battery 120 provides electric power for the main system 110, and the customer can use the product.

Furthermore, the electronic device 100 has no reset button. When the electronic device 100 crashes, the power button 130 can be pressed for a longer period to isolate the battery 120 from the main system 110, so as to accomplish a reset function In one embodiment, the power button 130 has a first terminal 3 and a second terminal 4. The first terminal 3 is electrically coupled with the battery 120, and the second terminal 4 is electrically coupled with the charging circuit 140. In use, the first and second terminals 3 and 4 are electrically connected to each other when the power button 130 is pressed; on the contrary, the first and second terminals 3 and 4 are electrically isolated from each other when the power button 130 is not pressed.

The charging circuit 140 may comprise a resistor R4 and a charging capacitor C2. The resistor R4 is connected to the second terminal 4 of the power button 130. A first terminal of the charging capacitor C2 is connected to the resistor R4, and a second terminal of the charging capacitor C2 is grounded. Therefore, when the first and second terminals 3 and 4 are electrically connected to each other, the charging capacitor C2 can be charged. Moreover, the above-mentioned predetermined period depends on the resistance of the resistor R4 and the capacitance of the charging capacitor C2.

The charging circuit 140 may comprise a first diode D1 and a second diode D2. The anode of the first diode D1 is connected to the second terminal 4 of the power button 130, and the cathode of the first diode D1 is electrically connected to the first switch circuit 151. The anode of the second diode D2 is connected to the first terminal of the charging capacitor C2, and the cathode of the second diode D2 is connected to the second terminal 4 of the power button 130. In use, the first and second diodes D1 and D2 are arranged to prevent the return current.

The charging circuit 140 may comprise a resistor R3. The resistor R3 is connected to the cathode of the first diode D1 and the first switch circuit 151

The first switch circuit 151 may comprise a first metal-oxide-semiconductor (MOS) Q3. The gate of the first MOS Q3 is connected to the first terminal of the charging capacitor C2, the drain of the first MOS Q3 is coupled with the voltage input terminal VIN, and the source of the first MOS Q3 is grounded.

The second switch circuit 152 may comprise a second MOS Q2. The gate of the second MOS Q2 is connected to the drain of the first MOS Q3, the drain of the second MOS Q2 is connected to the third switch circuit 153, and the source of the second MOS Q2 is grounded.

The third switch circuit 153 may comprise a third MOS Q1. The gate of the third MOS Q1 is connected to the drain of the second MOS Q2, the drain of the third MOS Q1 is connected to the voltage input terminal VIN, and the source of the third MOS Q1 is connected to the battery 120, where the gate and source of the third MOS Q1 are coupled to each other, so as to ensure that the main system 110 and the battery 120 are isolated from each other when the third MOS Q1 is cut off.

In view of above, the present invention provides the battery device power protection and reset circuit 170 to protect and/or reset the electronic device 100, without an additional processing chip or control chip. Therefore, costs are reduced.

In another aspect, the present disclosure is directed to a method of operating the electronic device 100. The electronic device 100 includes the main system 110, the battery 120, the charging circuit 140 and the switch device 150. This method comprises a step (a) of: utilizing the charging circuit 140 to turn off the switch device 150 when operating under a first trigger mode, so that the switch device 150 electrically isolates the main system 110 from the battery 120.

After the main system 110 is electrically isolated from the battery 120, the method further comprises a step (b) of: utilizing the charging circuit 140 to turn on the switch device 150 when operating under a second trigger mode, so that the switch device 150 electrically connect the main system 110 to the battery 120.

The electronic device 100 further includes a power button 130. In the step (a), when the power button 130 is pressed over a predetermined period, the charging circuit 140 in the first trigger mode is charged by the battery 120, so that a charging voltage of the charging circuit 140 turns off the switch device 150.

In the step (b), after the main system 110 is electrically isolated from the battery 120, when the power button 130 is pressed again but the duration of pressing the power button 130 is shorter than the predetermined period, the switch device 150 can be turned on by the charging circuit 140 in the second trigger mode.

The battery 120 and the charging circuit 140 are electrically connected to each other when the power button 130 is pressed, and the battery 120 and the charging circuit 140 are electrically isolated from each other when the power button 130 is not pressed.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. An electronic device comprising:
   a main system;
   a battery;
   a power button connected to the battery;
   a battery device power protection and reset circuit comprising:
      a switch device connected to the main system and the battery; and a charging circuit connected to the power button and configured for turning off the switch device when operating under a first trigger mode, so that the switch device electrically isolates the main system from the battery, wherein after the main system is electrically isolated from the battery, the charging circuit turns on the switch device when operating under a second trigger mode, so that the switch device electrically connects the main system to the battery, wherein when the power button is pressed over a predetermined period, the charging circuit operates under the first trigger mode and is charged by the battery, and a charging voltage of the charging circuit turns off the switch device, wherein after the main system is electrically isolated from the battery, when the power button is pressed again but duration of pressing the power button is shorter than the predetermined period, the charging circuit operates under the second trigger made to turn on the switch device, wherein the power button has a first terminal electrically coupled with the battery and a second terminal electrically coupled with the charging circuit, the first and second terminals are electrically connected to each other when the power button is pressed, and the first and second terminals are electrically isolated from each other when the power button is not pressed, wherein the charging circuit comprises a resistor and a charging capacitor, the resistor is connected to the second terminal of the power button, a first terminal of the charging capacitor is connected to the resistor, and a second terminal of the charging capacitor is grounded; when the first terminal and the second terminal of the power button are electrically connected to each other, the charging capacitor is charged; the predetermined period depends on a resistance of the resistor and a capacitance of the charging capacitor.

2. The electronic device of claim 1, wherein the switch device comprises a first switch circuit, and the first switch circuit comprises a first metal-oxide-semiconductor (MOS), wherein a gate of the first MOS is connected to the first terminal of the charging capacitor, a drain of the first MOS is coupled with a voltage input terminal of the main system, and a source of the first MOS is grounded.

3. The electronic device of claim 2, wherein the switch device comprises a second switch circuit, and the second switch circuit comprise a second MOS, wherein a gate of the second MOS is connected to the drain of the first MOS, and a source of the second MOS is grounded.

4. The electronic device of claim 3, wherein the switch device comprises a third switch circuit, and the third switch circuit comprises a third MOS, wherein a gate of the third MOS is connected to the drain of the second MOS, a drain of the third MOS is connected to the voltage input terminal of the main system, and the source of the third MOS is connected to the battery, wherein the gate of the third MOS and the source of the third MOS are coupled to each other.

* * * * *